United States Patent Office 3,498,460
Patented Mar. 3, 1970

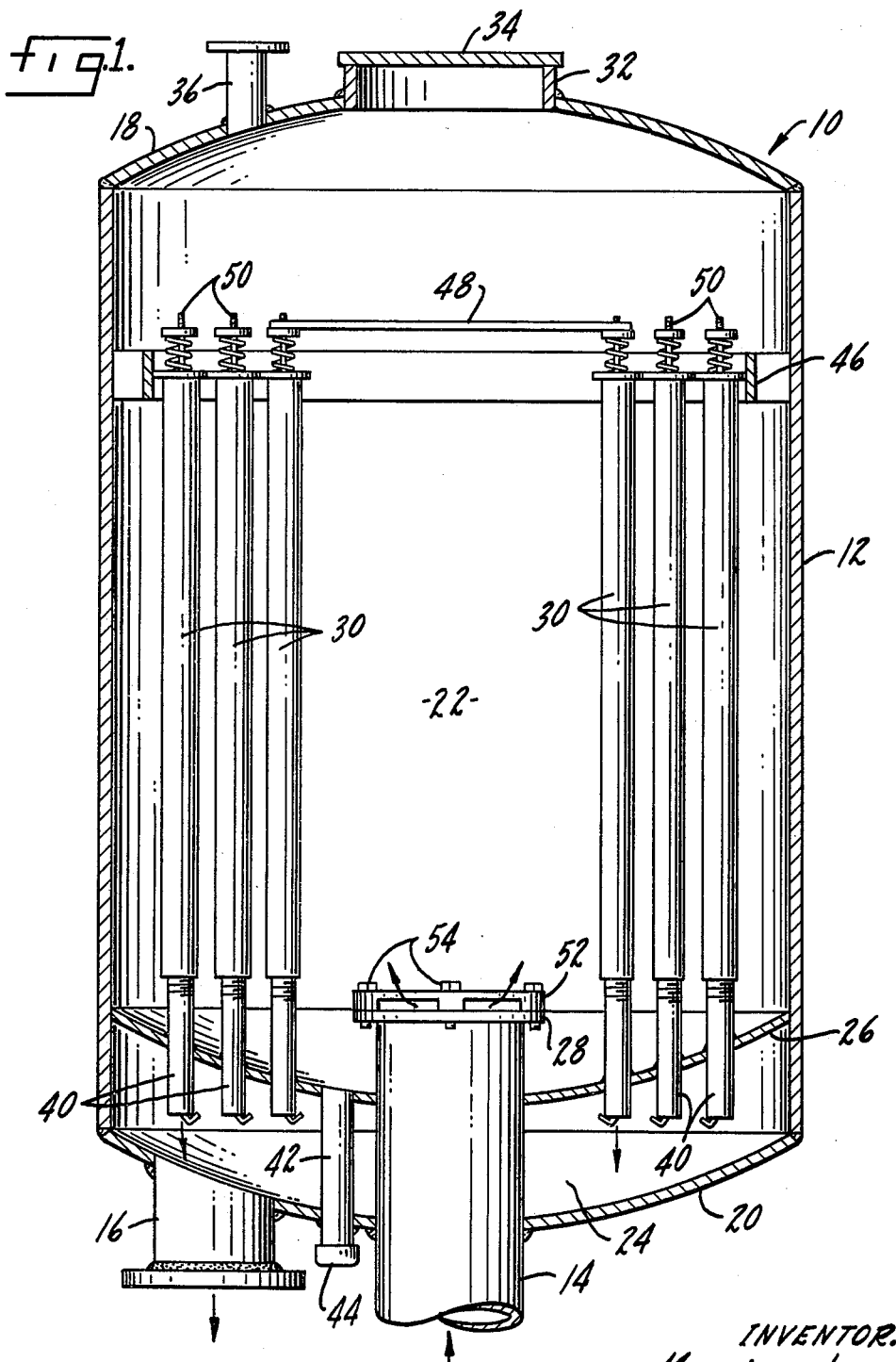

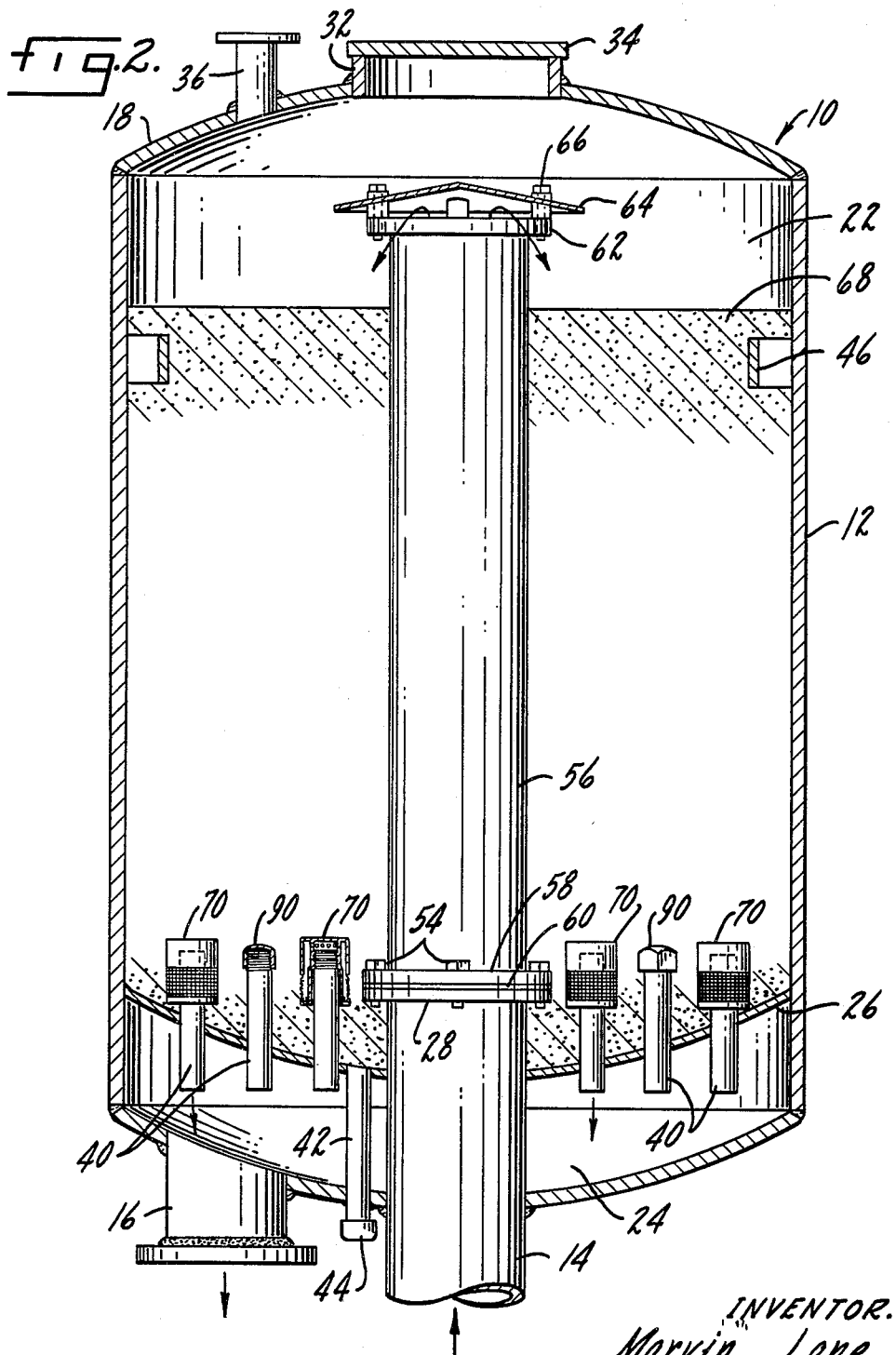

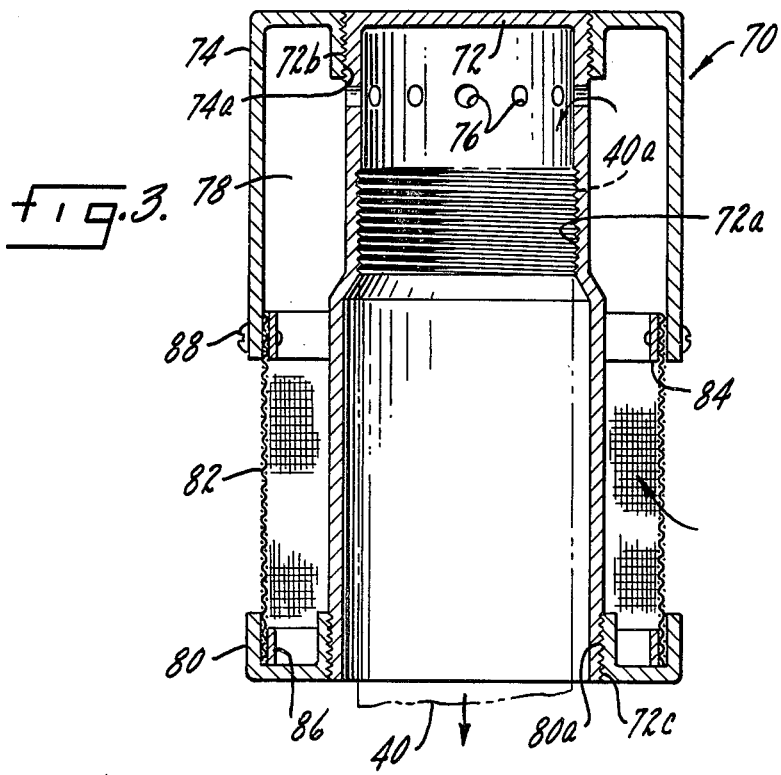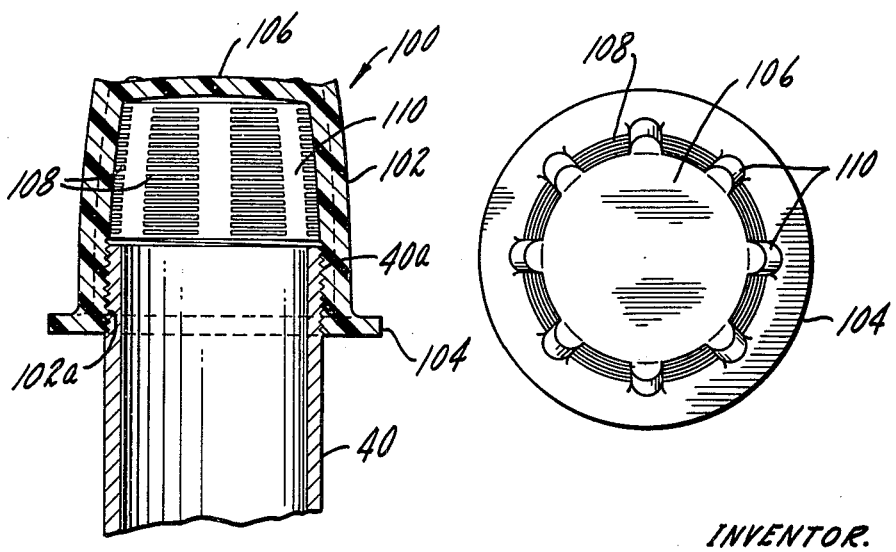

3,498,460
CONVERTIBLE FILTER APPARATUS
Marvin Lane, Cranford, N.J., assignor, by mesne assignments, to Union Tank Car Company, Chicago, Ill., a corporation of Delaware
Filed June 13, 1967, Ser. No. 645,764
Int. Cl. B01d 27/04, 25/06
U.S. Cl. 210—232   6 Claims

ABSTRACT OF THE DISCLOSURE

Filtration apparatus which is readily convertible from operation with filter cartridges to operation with a bed of granular media, such as ion exchange resin beads. The filter tank is partitioned into influent and effluent zones, and fluid to be filtered enters the tank through a conduit which passes through the effluent zone and the partition and discharges into the influent zone. Mounted in the partition are tubular seat means for holding annular filter cartridges; the seat means also provide a fluid path from the influent zone to the effluent zone. When the apparatrs is used with filter cartridges, the inlet conduit discharges fluid near the partition. However, when it is desired to use a bed of granular media, the filter cartridges are removed and an extension is connected to the inlet conduit so that it discharges fluid near the top of the tank, above the level of the bed. Strainers are placed over the ends of the seat means so that granular media will not pass into the effluent zone.

BACKGROUND—SUMMARY—DRAWINGS

The present invention relates to filtration apparatus, and more particularly to a filter tank which is readily convertible for use with filter cartridges to use with a bed of granular media.

A typical filter tank which employs annular filter cartridges as the filtration means is described in United States Patent No. 3,279,608, issued Oct. 18, 1966 and assigned to the assignee of the present application.

Under certain circumstances, such filter cartridges, with or without filter precoat media, are unable to provide effective removal of certain impurities from a fluid, as for example, from steam condensate, and it may become necessary to pass the fluid through a filter containing a bed of granular media, as for example, ion exchange resin beads, crushed anthracite coal, or the like, either before or after treatment with the filter cartridges. This, of course, is an expensive and wasteful procedure, since it requires two separate filter tanks. Moreover, since many of the impurities which cannot be effectively removed by ordinary filter cartridges are present in fluids only very infrequently, such as during start-up of a once-through boiler system, the second filter tank containing the filtration bed is used only on a limited basis. This results in tying up expensive equipment for only sporadic use.

The present invention overcomes these drawbacks by providing filtration apparatus which is readily convertible from operation with filter cartridges to operation with a bed of granular media. In accordance with the invention, there is provided a filter tank which is divided into an influent zone and an effluent zone by a partition. Mounted in the partition are seat means for holding annular filter cartridges within the influent zone. The seat means also provide a fluid path from the influent zone to the effluent zone. Fluid to be filtered is normally discharged into the influent zone at a point near the partition. However, when it is desired to operate the filter tank with a bed of granular media, the filter cartridges are removed and an extension conduit is placed within the filter tank so that the incoming fluid is discharged into the influent zone near the top of the tank, and above the level of the filtering bed. To prevent granular media from passing through the seat means, covering strainers are provided.

Convertible filtration apparatus of the type described makes possible the rapid and inexpensive conversion of a filter tank from operation with filter cartridges to operation with a bed of granular media. The additional components necessary for converting the tank are quite inexpensive and can be installed quickly.

The invention will be more fully understood by considering the following description, with illustrative reference to the drawing, in which:

FIGURE 1 is a sectional side elevation of an exemplary convertible filtration apparatus adapted for operation with filter cartridges in accordance with the present invention;

FIGURE 2 is a view similar to that of FIGURE 1, showing the apparatus converted in accordance with the invention for operation with a bed of granular media;

FIGURE 3 is a sectional side elevation of an exemplary straining device for use in connection with the invention;

FIGURE 4 is a view similar to that of FIGURE 3, showing an alternative form of straining device; and FIGURE 5 is a plan view of the straining device depicted in FIGURE 4.

DESCRIPTION OF EXEMPLARY EMBODIMENT

With reference to FIGURE 1, there is shown convertible filtration apparatus generally denoted by the number 10. The apparatus 10 includes a filter tank 12 having a lower end portion 20 and an upper end portion 18. An outlet conduit 16 and an inlet conduit 14 communicate with the tank 12 through the lower end portion 20. In the upper end portion 18 is a vent 36 which may be of any suitable construction, and the selection of appropriate vent means will depend upon the use of the filtration apparatus 10 and will be within the ordinary skill of one in the art. The upper end portion 18 also defines a small manhole opening 32 which has a removable cover means 34; the opening 32 provides access to the interior of the tank 12.

Within the tank 12 is a tube sheet plate 26 which partitions the interior of the tank into an influent zone 22 and an effluent zone 24. The inlet conduit 14 extends upwardly through the effluent zone 24 and terminates in the influent zone 22 near the tube sheet plate 26. The inlet conduit 14 may be secured to the lower end portion 20 and to the tube sheet plate 26 by welding or other suitable means. The inlet conduit 14 is provided with a flange 28 which is suitably apertured to receive bolts 54 Secured to the flange 28 by the bolts 54 is a fluid distribution or deflector means 52. Fluid leaving the inlet conduit 14 in the influent zone 22 is distributed radially outwardly by the deflector means 52. A media transfer conduit 42, which closure means 44, enters the tank 12 through the lower end portion 20 and extends upwardly through the effluent zone 24 and the tube sheet plate 26 to communicate with the influent zone 22.

Attached to the tube sheet plate 26 are filter cartridge seat means 40, which are tubular structures and which serve to provide a fluid path from the influent zone 22 to the effluent zone 24. The seat means 40 may be attached to the tube sheet plate 26 by welding, or other suitable means, and are threaded at their upper ends. Mounted on the seat means 40 are a plurality of filter cartridges 30. The filter cartridges 30 are preferably annular, nylon-wound filter elements, though other natural or synthetic fibers may be employed as is well known in the art. The filter cartridges 30 are held in place on the seat means 40 by holding means 50 and brace means 48, which provide for ready removal of the filter cartridges from the tank 12. A particularly suitable structure for the holding means 50 is described in United States Patent No. 3,279,608, issued Oct. 18, 1966. An annular member 46 is also provided around the inner circumference of the tank 12 to maintain the array of filter cartridges 30 in proper alignment.

As shown by the directional arrows, fluid to be filtered enters the tank 12 through the inlet conduit 14 and passes upwardly through the effluent zone 24 and the tube sheet plate 26 to be distributed in the influent zone 22 by the deflector means 52. The fluid then passes through the filter cartridges 30 and through the interior of the tubular seat means 40 to the effluent zone 24. Finally, the fluid leaves the tank 12 through the outlet conduit 16 which communicates with the effluent zone 24.

Turning now to FIGURE 2, there is shown filtration apparatus 10 which is similar in many respects to that shown in FIGURE 1, except that the former has been converted in accordance with the present invention for operation with a bed of granular media 68. It will be noted that the filter cartridges 30 have been removed from the tank 12 through the manhole opening 32. This may be conveniently done as described in United States Patent No. 3,279,608, issued Oct. 18, 1966.

The inlet conduit 14 has been extended by the addition of an inlet extension conduit 56 having a flange 58 at its lower end and a similar flange 62 at its upper end. The flange 58 of the inlet extension conduit 56 is secured to the flange 28 of the inlet conduit 14 by the bolts 54. A suitable gasket 60 may be provided between the flanges 58 and 28. Secured to the upper flange 62 of the inlet extension conduit 56 by bolts 66 is a second form of fluid distribution or deflector means 64. Again, as in the case of the deflector means 52 described in FIGURE 1, fluid leaving the conduit 56 is distributed radially outwardly of the deflector means 64. It will be noted that the inlet extension conduit 56 extends to a point above the upper level of the bed of granular media 68.

To prevent any of the granular media 68 from entering the effluent zone 24 through the tubular seat means 40, the seat means are provided with suitable strainers 70, which may be threaded or otherwise attached to the seat means in conventional removable fashion. In the event it is desired to close one or more of the seat means 40 to the passage of fluid from the influent zone 22 to the effluent zone 24, a threaded closure cap 90 may be provided as shown.

FIGURE 3 shows in more detail a form of strainer 70 which is particularly suitable for use in accordance with the present invention. A main cylindrical body 72 fits over the end of the seat means 40 and has threads 72a which mate with the threaded end portion 40a of the seat means. An annular member 74, having threads 74a which mate with threads 72b at the top of the body 72, cooperates with the body 72 to define an annular fluid passageway 78. A flanged screen retaining member 80 is attached to the bottom of the body 72 by threads 80a which mate with threads 72c. A cylindrical straining screen 82 rests against the members 74 and 80 and is maintained in position by retaining rings 84 and 86. Screws 88 are provided to lock the screen 82 in place between the member 74 and the ring 84.

It will be noted that the body 72 has a plurality of apertures 76 which serve to provide a fluid path between the passageway 78 and the interior of the body 72. As shown by the arrows, fluid enters the strainer 70 through the screen 82, passes into the passageway 78, through the apertures 76, and exits through the interior of the seat means 40.

The illustrated form of strainer 70 may be advantageously constructed from metal, although plastic or other suitable materials may be employed as well.

FIGURES 4 and 5 depict another form of strainer 100 whose design is well suited to fabrication from plastic materials, such as nylon, etc. The strainer 100 comprises a thimble-shaped body 102 having an annular flange 104 and a closed top 106. The body 102 has interior threads 102a which mate with the threaded end portion 40a of the seat means 40. A plurality of straining slots 108, separated by ribs 110, are provided in the body 102 so that fluid may pass into the interior of the seat means 40.

As was true in the case of the apparatus described in FIGURE 1, fluid to be filtered enters the tank 12 through conduit 14 and passes upwardly through the effluent zone 24 and the tube sheet plate 26. Due to the placement of the inlet extension conduit 56, however, the fluid continues to flow upwardly until it is distributed near the upper end of the influent zone 22 by the deflector means 64. The fluid then passes downwardly through the bed of granular media 68, passes through the strainers 70 as described above in connection with FIGURE 3, and arrives at the effluent zone 24 where it is removed from the tank through the conduit 16. The granular media 68 may be conveniently placed in and removed from the tank 12 through the transfer conduit 42.

As is apparent from the foregoing, the present invention provides means whereby the filtration apparatus 10 may be rapidly and inexpensively converted from operation with the filter cartridges 30 to operation with the bed of granular media 68.

Although an embodiment constructed in accordance with the present invention has been described with the requisite particularity, the disclosure is of course only exemplary. Consequently, numerous changes in details of construction, in size, configuration and arrangement of components and materials, and in modes of application will be apparent to those familiar with the art and may be resorted to without departing from the scope of the invention as set forth in the following claims.

I claim:

1. Filtration apparatus adapted for selective employment of annular filter cartridges or a filtering bed, comprising: a filter tank having first and second end portions; partition means mounted in said tank and defining an influent zone in conjunction with said first end portion and an effluent zone in conjunction with said second end portion; fluid outlet means communicating with said effluent zone; fluid inlet means communicating with said influent zone at a first termination point in said tank near said partition means; removable inlet extension means adapted for mounting on said fluid inlet means to extend said inlet means to a second termination point in said tank near said first end portion; seat means mounted in said partition means and extending therethrough to provide a fluid communication path from said influent zone to said effluent zone; a removable annular filter cartriddge adapted for mounting on said seat means in said influent zone; and straining means adapted for mounting on said seat means in said influent zone in lieu of said filter cartridge.

2. Apparatus according to claim 1, further including closure means adapted for mounting on said seat means in said influent zone in lieu of said filter cartridge or said straining means, said closure means being adapted to block said fluid communication path from said influent zone to said effluent zone.

3. Apparatus according to claim 1, wherein said inlet means comprises an inlet conduit which enters said tank in said second portion, extends through said effluent zone, and passes through said partition means to terminate in said influent zone at said first termination point.

4. Apparatus accordding to claim 3, wherein said inlet extension means comprises a second conduit removably connected to said inlet conduit at said first termination point and extending therefrom to said second termination point.

5. Apparatus according to claim 4, wherein said second conduit is provided with fluid distribution means at said second termination point.

6. Apparatus according to claim 3, wherein said inlet conduit is adapted to selectively hold fluid distribution means in said influent zone at said first termination point in lieu of said inlet extension means.

References Cited

UNITED STATES PATENTS

| | | | |
|---|---|---|---|
| 956,914 | 5/1910 | Ward | 210—288 X |
| 2,440,487 | 4/1948 | Rayburn | 210—323 X |
| 2,772,780 | 12/1956 | Penick | 210—293 X |
| 3,149,072 | 9/1964 | Silverman | 210—232 |
| 3,279,608 | 10/1966 | Soriente et al. | 210—323 X |

SAMIH N. ZAHARNA, Primary Examiner

U.S. Cl. X.R.

210—288, 289, 323